Nov. 10, 1959     C. A. MILLER     2,912,002

CHECK VALVE

Filed May 21, 1956

INVENTOR
CARL A. MILLER
BY
*Pennie, Edmonds, Morton, Barrows & Taylor*
ATTORNEYS United States Patent Office 2,912,002
Patented Nov. 10, 1959

2,912,002
CHECK VALVE

Carl A. Miller, White Bear, Minn., assignor to Economics Laboratory, Inc., St. Paul, Minn., a corporation of Delaware Application May 21, 1956, Serial No. 586,176

3 Claims. (Cl. 137—541)

This invention comprises a check valve of few parts readily assembled or replaced, rapid and reliable in operation, and of extremely long life.

In brief, the valve according to the present invention includes a body having two successive bores of different diameters passing therethrough from the inlet end to the outlet end, the bore of smaller diameter being at the outlet end and forming a shoulder at its junction with the larger bore. The smaller bore is preferably of polygonal cross-section. A counterbore at the outlet end provides a valve seat. The valve stem, adapted to reciprocate within both bores, includes a shank of diameter slightly less than the minimum diameter of the smaller bore so as to be guided by the wall of the smaller bore. A preferably removable valve ring of resilient material, such as a rubber O-ring, is secured to the shank near the outlet end. On the other end of the shank there is an enlarged head-like portion of diameter greater than that of the smaller bore and slightly less than that of the larger bore whereby to be guided by the wall of the larger bore. A helical spring is disposed around the shank between the mentioned shoulder and the valve stem head, so as resiliently to urge the valve ring against its seat. Suitable fluid passage means extend from the inlet end of the valve to the outlet end of the larger bore immediately behind the valve ring, so that when the valve is closed the fluid cannot pass the ring on its seat, and when it is fully open the fluid flows substantially without restriction past the ring.

A better understanding of the construction of the valve comprising this invention may be had by reference to the accompanying drawing in which.

Figure 1:
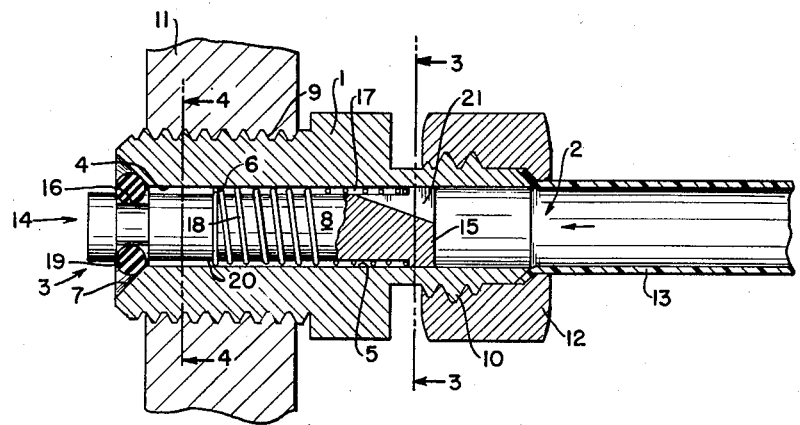
Fig. 1 is a longitudinal cross-sectional view of the valve when closed.

Referring to the drawing, the check valve of the present invention comprises a body 1 of brass, or other suitable material, through which a bore passes from the inlet side 2 to the outlet side 3. This bore comprises two successive portions, a portion 4 of smaller diameter and a portion 5 of larger diameter. The surface formed by the junction of these two bore portions comprises a shoulder 6. The outlet end 3 of the valve is counterbored at an angle, preferably of approximately 45° to the axis of the bore, providing a valve seat 7. It is preferable that this valve seat constitute the extreme outlet end of the valve in order to avoid a chamber or other constriction which might interfere with the immediate flow of fluid from the valve.

Figure 4:
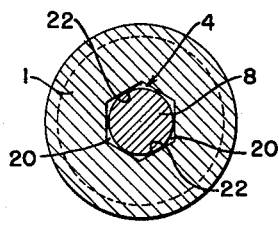
Fig. 4 is a transverse sectional view taken along the line 4—4 of Fig. 1.

The larger bore portion 5, as here shown, is of round cross-section of uniform diameter. The smaller bore 4 may also be round but, since its inside wall constitutes a guide for the valve stem, suitable provision for conducting the fluid past this portion must be provided. Hence, in accordance with the invention the smaller bore portion is preferably of polygonal, here hexagonal, cross-section, and may be formed by a broaching operation. As shown in Fig. 4 this hexagonal portion provides six flat surfaces 22 which guide the shank 8 and six angular passages 20 through which the fluid flows. The diameter of the shank should be slightly less than the diameter across opposite faces 22 of the hexagon to provide a sliding and guiding fit therebetween. Fluid ducts of other forms could obviously be substituted for those here described. For example, a suitable number of grooves of any convenient shape can be cut along the wall of the smaller bore, which can then be round. However, such grooves or passages should be so proportioned where they terminate at the surface of the valve seat 7 as to be closed by the valve ring when seated.

Suitable threads 9 formed on the larger end of the valve body permit the valve to be secured in a wall or other member 11. Shorter threads 10 are provided at the inlet end of the valve body to receive a coupling nut 12 which, in this embodiment, holds an inlet pipe 13 of metal or plastic, but here represented as of plastic material.

The valve stem 14 which is arranged to reciprocate in the bore of the valve body is, like the body above described, preferably formed of a single piece of suitable material such as brass, although the material and the method of forming it should be selected for the application for which the valve is intended. This stem is extremely simple in construction since it comprises essentially a straight shank portion of uniform diameter, having an enlarged rigid portion or head 15 on the inlet end and a circular groove 16 near the outlet end. The diameter of the head 15 is larger than that of the shank portion but slightly smaller than the diameter of the larger portion of the bore so as to make a sliding and guiding fit therein. Thus, the wall of the larger bore portion comprises a guide for the head of the valve stem and, as before mentioned, the wall of the hexagonal bore portion comprises symmetrical guide surfaces for the shank of the valve stem. The clearance space 17 between the shank and the inside wall of the larger bore comprises a continuation of the fluid passages 20 above mentioned.

In order to permit fluid flow past the head 15, a fluid channel 21 is cut through the head, and preferably through an adjacent part of shank 8, as shown, to facilitate the flow. A large straight cut at a suitable angle, such as 18°, has proved to be satisfactory, although a larger number of smaller channels symmetrically distributed around the head could be employed if preferred. However, as above indicated, the rigidity of the head should not be impaired by such channeling.

Within space 17 a helical compression spring 18 is disposed around the shank 8 so as resiliently to press against shoulder 6 on one end and against the opposed surface of head 15 on the other end. Thus, this spring urges the valve stem in a direction toward the inlet end of the valve and thereby holds the valve normally closed. Fluid pressure on head 15 opposes the action of the spring, tending to open the valve.

Figure 2:
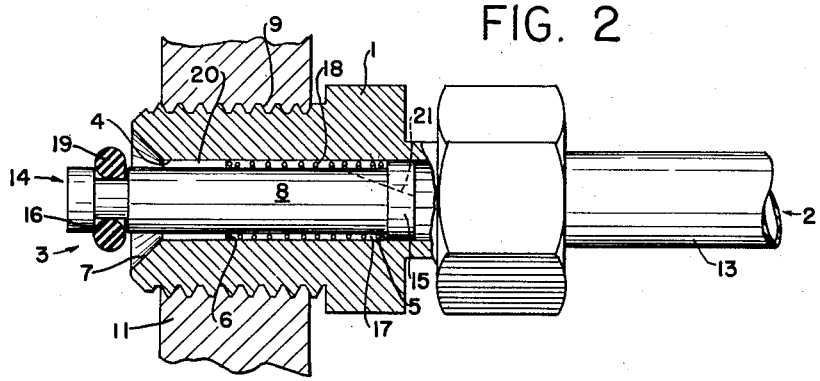
Fig. 2 is a corresponding view, partly in section, of the valve when open.
Figure 3:
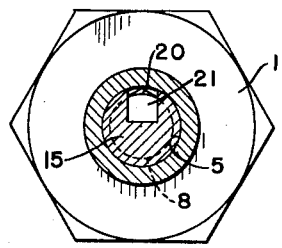
Fig. 3 is a transverse sectional view taken along line 3—3 of Fig. 1.

Around shank 8, near the outlet end thereof, a groove 16 is formed as above mentioned. This groove is proportioned to receive a valve ring 19, preferably of the O-ring type, of resilient material such as rubber. As is clear from the drawing, when the valve stem is retracted, as shown in Fig. 1, this O-ring presses against seat 7 closing the fluid passages 20. On the other hand, when the valve is open, as shown in Fig. 2, the stem moves far enough to permit the O-ring 19 to clear the valve body completely, thus permitting rapid and unrestricted flow. Actually the valve stem can move to the left at least three times as far as shown in Fig. 2. It will be noted that the valve constructed as herein described permits flow as soon as the valve stem has just commenced its opening movement, and that only a comparatively small additional movement of the valve stem is required to provide maximum flow.

The valve of my invention is extremely simple to assemble, because this operation requires merely that the spring 18 be placed over shank 8 and the valve stem with the spring around it dropped into the bore 5 from the inlet end. Then, with slight pressure applied to the head 15, the outlet end of the valve shank protrudes from the counterbore 7. While the shank is in that position the O-ring 19 is slipped into groove 16, to complete the assembly. To disassemble the valve it is required merely to remove the O-ring from groove 16 and withdraw the valve stem from the inlet end.

In addition to the previously described advantages which are provided by the check valve of the present invention, the following may be mentioned: The part first to wear is likely to be the O-ring 19 which can be readily and quickly replaced, although experience has proved that even the O-ring has an extremely long life. If the valve seat 7 becomes worn it can readily be renewed with a counterboring tool. This operation can be repeated almost indefinitely without requiring any other change or adjustment in the valve, because the valve stem is inherently self-compensating. It will be observed from Figs. 1 and 2 that in all operating positions of the valve, the head 15 remains within the bore of the valve body. This is desirable especially if the inlet pipe 13 is subject to bending near the coupling nut 12, because if the stem 14 should protrude from the nut 21 into pipe 13 it might jam and interfere with the valve action. Also, by remaining within the larger bore 5, the head 15 will be suitably guided at all operating positions of the valve stem.

I claim:

1. A check valve comprising a body having a bore through the center thereof from the inlet end to the outlet end, a portion of said bore being circular and of uniform diameter and the remaining portion of the bore being of hexagonal section, the interfacial diameter of the hexagonal portion being less than the diameter of the circular portion, a shoulder formed by the junction of said hexagonal and round bore portions, the exterior end of the hexagonal portion being circularly counterbored at an angle of approximately 45 degrees to the axis of the bore to form a continuous annular valve seat, a valve stem including a straight shank of solid material and substantially uniform diameter adapted to pass through the hexagonal portion with a sliding fit, a rigid annular head on one end of said shank, said head being of diameter greater than that of the remainder of the shank but slightly less than that of said circular bore portion and at all operating positions making a sliding fit within said bore so as to be guided by the same, a fluid-conducting channel through said head, a circular groove around said shank near the other end thereof, an O-ring of resilient material in said groove, said O-ring having an outside diameter greater than the diameter of the hexagonal section whereby to seat against said annular valve seat, and a compression spring around said shank bearing resiliently against said shoulder and the opposed surface of said head.

2. A check valve comprising a body having an inlet end, an outlet end and a bore therethrough from the inlet end to the outlet end, said bore being divided into portions of two unequal diameters, respectively, a shoulder formed by the junction of said bore portions, a circular counterbore at the exterior end of the smaller bore portion forming a surface at an angle substantially less than 90 degrees with respect to the axis of the bore to form a continuous annular valve seat, fluid passages along the inner wall of said smaller bore portion and extending between said shoulder and the surface of said counterbore, a valve stem including a straight shank of uniform diameter slightly less than that of said small bore and forming a guiding fit in said small bore at all positions of said shank, a rigid annular head on one end of said shank, said head being of diameter greater than that of the shank and slightly less than that of the larger bore such as to make a sliding fit therein and be guided thereby, a fluid-passing channel through said head, a circular groove around said shank near the other end thereof, a valve ring in said groove, said ring having an outside diameter greater than the diameter of the smaller bore whereby to seat against said annular valve seat so as to close said fluid passages, said valve stem being of such length that at all operating positions said head is wholly within said larger bore, and a helical compression spring positioned around said shank so as resiliently to bear against said shoulder and said head.

3. A check valve comprising a body having two successive bores of different diameters passing therethrough from the inlet end to the outlet end, the bore of smaller diameter being at said outlet end, a shoulder at the junction of said bores, a counterbore at said outlet end forming a continuous valve seat at an angle of less than 90 degrees to the axis of said smaller bore, a valve stem adapted to reciprocate within said bores and including a shank of uniform diameter throughout its length and of a diameter slightly less than that of said smaller bore whereby to make a sliding fit therein and be guided by the wall of the smaller bore at all positions of said shank, a circular groove around said shank near the outlet end thereof, a removable valve ring of resilient material secured in said groove, said valve ring having an outside diameter greater than the diameter of said smaller bore, whereby said ring closes against said valve seat, a rigid head portion on said shank at the inlet end thereof and of a diameter greater than that of said smaller bore and slightly less than that of said larger bore, whereby to make a sliding fit therein and be guided by the wall of the larger bore, spring means interposed between said shoulder and head portion urging said valve stem toward said inlet end thereby urging said valve ring against said seat, and fluid passage means for conducting fluid from the inlet end of said valve to an exterior surface of said shank behind said ring when in closed position, said passage means including the space formed between said shank and the wall of said larger bore and a fluid-conducting channel through said head portion to interconnect said inlet end and said space.

References Cited in the file of this patent

UNITED STATES PATENTS

| | | |
|---|---|---|
| 574,992 | Held | Jan. 12, 1897 |
| 617,272 | Beman | Jan. 3, 1899 |
| 1,170,412 | Campbell | Feb. 1, 1916 |
| 1,313,554 | Nielson | Aug. 19, 1919 |
| 1,781,681 | Cooke | Nov. 18, 1930 |
| 2,690,895 | Barcus | Oct. 5, 1954 |
| 2,764,385 | Sieling | Sept. 25, 1956 |
| 2,855,946 | Mackal | Oct. 14, 1958 |